United States Patent
Lee et al.

(10) Patent No.: US 11,305,747 B1
(45) Date of Patent: Apr. 19, 2022

(54) CONTROL FOR BRAKE SYSTEM OF VEHICLE

(71) Applicant: Zoox, Inc., Foster City, CA (US)

(72) Inventors: Clement Ching-Fai Lee, Campbell, CA (US); Collin MacGregor, Foster City, CA (US); Aaron Rosekind, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 208 days.

(21) Appl. No.: 16/698,855

(22) Filed: Nov. 27, 2019

(51) Int. Cl.
*B60T 13/66* (2006.01)
*B60T 13/58* (2006.01)
*B60T 15/04* (2006.01)

(52) U.S. Cl.
CPC .......... *B60T 13/662* (2013.01); *B60T 13/588* (2013.01); *B60T 15/041* (2013.01); *B60T 2201/10* (2013.01); *B60T 2270/402* (2013.01)

(58) Field of Classification Search
CPC .... B60T 13/662; B60T 13/558; B60T 15/041; B60T 2270/402; B60T 2201/10
See application file for complete search history.

(56) References Cited

U.S. PATENT DOCUMENTS 10,424,135 B2 * 9/2019 Poeppel ............... G06Q 10/20
10,960,776 B2 * 3/2021 Foley ................ G01R 31/3842
2009/0195058 A1 * 8/2009 Jackson ................ B60T 7/122
　　　　　　　　　　　　　　　　　　　　　303/20
2019/0344762 A1 * 11/2019 Alfter ................ B60W 50/023
2021/0179127 A1 * 6/2021 Lopez .................. B60W 50/12
2021/0277995 A1 * 9/2021 Hutchins ................ F16H 59/54

FOREIGN PATENT DOCUMENTS

| CN | 109843673 | A | * | 6/2019 |
| CN | 109952240 | A | * | 6/2019 |
| CN | 112055676 | A | * | 12/2020 |
| DE | 3741635 | A1 | * | 11/2020 |
| EP | 3626559 | A1 | * | 3/2020 |

* cited by examiner

*Primary Examiner* — Pamela Rodriguez
(74) *Attorney, Agent, or Firm* — Lee & Hayes, P.C.

(57) ABSTRACT

Methods and systems for controlling the parking brakes of a vehicle are provided. The system comprises a first brake unit; a second brake unit; a third brake unit; a fourth brake unit; a first controller powered by a first power source; a second controller powered by a second power source and communicatively coupled to the first controller via a first and second communication link; and a third controller powered by the first power source and communicatively coupled to the first controller via a third communication link and to the second controller via a fourth communication link, wherein the second controller, based at least in part on a signal received from the first controller, operates the first brake unit and the fourth brake unit, and the third controller, based at least in part on the signal received from the first controller, operates the second brake unit and the third brake unit.

20 Claims, 8 Drawing Sheets

CONTROL FOR BRAKE SYSTEM OF VEHICLE

BACKGROUND

Parking brakes are used on vehicles to hold the vehicles stationary. This is often achieved by using a manual parking brake. In an electric parking brake (EPB) system, a command may be generated by a driver or a passenger in a vehicle operating a button or lever to activate the parking brake controller. A control signal may be transmitted to one or more brake units to stop the vehicle or hold the vehicle stationary. As the parking brake system is electrically controlled, any failure associated with the parking brake controller or the communication link over which the control signal is transmitted, may prevent the vehicle from stopping or being held stationary.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
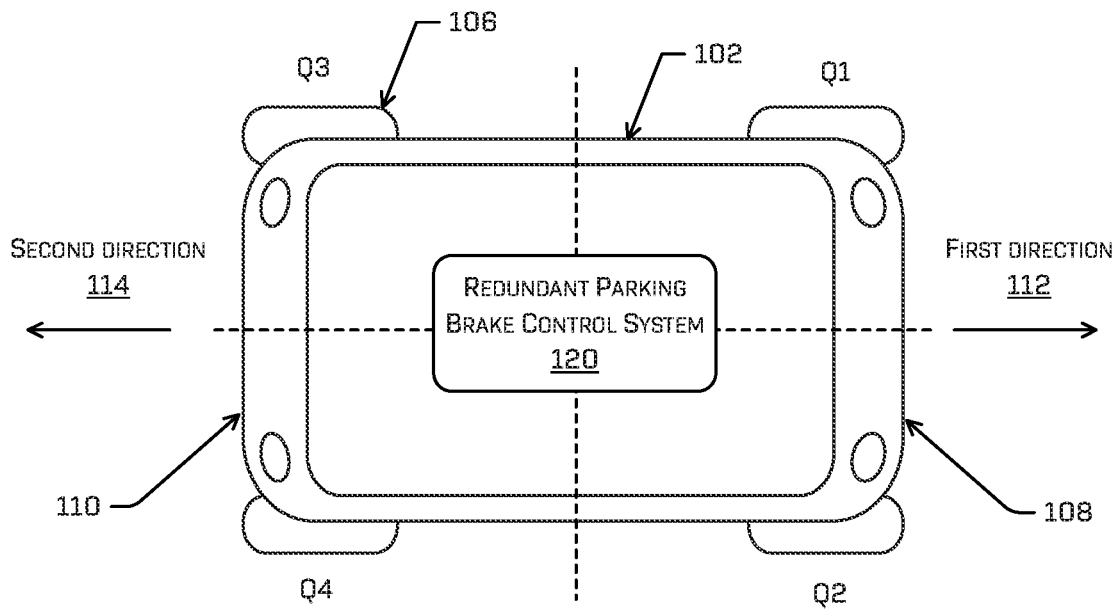
FIG. 1 illustrates a schematic top view of an example vehicle with various brake units, in accordance with examples of the disclosure.

Techniques for providing electric parking brake control to vehicles are discussed herein. In some cases, the control of one or more parking brakes may be unavailable (e.g., due to failure). When the control of all parking brakes is lost, the vehicle may be unable to hold stationary causing potential safety issues if, for example, the vehicle is parked on a gradient road. This application describes techniques to control parking brakes under various failure situations. The techniques for controlling parking brakes may be implemented by one or more computing device(s) of the vehicle.

In some examples, the system for parking brake control of the vehicle may comprise a primary controller that receives a message comprising a request to engage a braking operation from the computing device(s) of the vehicle. The primary controller may refer to a first controller. The system for parking brake control may further comprise at least a backup controller. For example, the system for parking brake control may further comprise a second controller and a third controller, each of which operates two parking brakes associated with a first end and a second end of the vehicle, respectively. The primary controller may provide a control command to the second controller and the third controller to operate the parking brakes upon receiving the message comprising the request to engage the braking operation. The two parking brakes controlled by the second controller are disposed at diagonally opposite ends of the vehicle from one another, and the two parking brakes controlled by the third controller are disposed at diagonally opposite ends of the vehicle from one another. In an electric parking brake system, the request to engage the braking operation may be generated by a driver or a passenger in the vehicle by operating a button or lever. Additionally, or alternatively, the request to engage a braking operation may be generated by the computing device(s) of the vehicle. Further, the request to engage a braking operation may be generated by remote computing device(s) that communicate with the computing device(s) of the vehicle via a network. The request to engage a braking operation may be transmitted through the first controller to the second controller and the third controller to operate the parking brakes. When a failure associated with the first controller is detected by the computing device(s) of the vehicle, the computing device(s) of the vehicle may activate the second controller to operate as a secondary controller to provide a control command to itself and the third controller to operate the parking brakes respectively associated therewith. When a failure associated with the first controller and the second controller is detected by the computing device(s) of the vehicle, the computing device(s) of the vehicle may activate the third controller to operate as a tertiary controller to provide a control command to itself to operate the parking brakes associated therewith. In some examples, when a failure is associated with the first controller and the second controller, the third controller may operate without instructions from the computing device(s) of the vehicle to control the parking brakes associated therewith (e.g., by defaulting to engage one or more braking systems of the vehicle (parking, emergency, etc.)). The parking brake control scheme according to the present disclosure may ensure that at least two parking brakes operate to hold the vehicle stationary, even in the event of failure of one or more controllers.

In some examples, the first controller and the third controller may receive power from a first power source and the second controller may receive power from a second power source. The computing device(s) of the vehicle may determine the status of the first power source and the second power source, e.g., whether there is a failure associated with the first power source and/or the second power source. A failure associated with the first power source may lead to a failure associated with the first controller and/or the third controller. In this circumstance, the second controller may operate its associated parking brakes. In other examples, a failure associated with the second power source may lead to a failure associated with the second controller. In this circumstance, the first controller may provide the control command to the third controller to operate its associated parking brakes. In some examples, the first power source or the second power source may be a low voltage (e.g., 0-48 volts) input sourced from on-vehicle batteries. When there is a loss or interruption of the power input from the on-vehicle batteries, the first, second or third controller may cease functionality.

In some examples, in addition to the power supply failure, other factors may cause the first controller, the second controller, and/or the third controller to be unable to operate, such as, programmable software failure, short circuit, physical damage to one or more components of the first controller, the second controller, and/or the third controller. The computing device(s) of the vehicle may determine the status of the first controller, the second controller, and/or the third controller (e.g., whether there is a failure associated with one or more of the first controller, the second controller, and/or the third controller). As a non-limiting example, a heartbeat signal, query response, or other signal may provide the status of any one or more of the controllers. The computing device(s) of the vehicle may further determine which controller(s) to be activated to provide the command to operate the parking brakes.

In some examples, the first controller may communicate with the second controller through a first communication link and/or a second communication link. The third controller may communicate with the first controller through a third communication link and may communicate with the second controller through a fourth communication link. The first communication link may operate as a primary communication link between the first controller and the second controller, and the second communication link may operate as a secondary communication link between the first controller and the second controller. The third communication link may operate as a primary communication link for the third controller to receive the control command. When the third communication link is unavailable to transmit/receive the control command between the first controller and the third controller, the fourth communication link may operate as a secondary communication link for the third controller to receive the control command from the second controller.

In some examples, the computing device(s) of the vehicle may determine the status of the first communication link, the second communication link, the third communication link, and/or the fourth communication link (e.g., whether there is a failure associated with one or more of those communication links). In the event of failure of only one of the first communication link, the second communication link, the third communication link, or the fourth communication link fails (and assuming the first controller, the second controller, and the third controller are operational), the control of all of the parking brakes may be available.

Based at least in part on an operational status of the second controller, the second controller may transmit a message indicative of the status of the second controller to the first controller via one or more of the first or second communication links and transmit the message to the third controller via the fourth communication link. The third controller, based at least in part on receiving the message and an operational status of the third controller, may transmit the message to the first controller via the third communication link. Similarly, the third controller may transmit its status to the first controller via third communication link, as well as to the second controller via the fourth communication link which may, in turn, transmit the third controller status to the first controller via one or more of the first and second communication links.

In some examples, the first controller may receive a message comprising a request to engage a braking operation from the computing device(s) of the vehicle. The first controller may transmit the message to the second controller via the first and second communication link and transmit the message to the third controller via the third communication link. The third controller, based at least in part on receiving the message, may transmit the message to the second controller and operate the second brake unit and the third brake unit. Further, the second controller, based at least in part on receiving the message, may operate the first brake unit and the fourth brake unit. In some examples, the first controller may transmit the message to the second controller and the third controller regardless the status of the first, second, or third communication links.

In some examples, the first controller may receive a status message indicative of a state of the second controller via one or more of the first or second communication links and determine whether the second controller has failed based at least in part on an amount of time since the status message was received. Furthermore, the first controller may receive a status message indicative of a state of the third controller via the third communication link and determine whether the third controller has failed based at least in part on an amount of time since the status message was received. Alternatively, or additionally, the second controller may receive a status message indicative of a state of the third controller via the fourth communication link and determine whether the fourth controller has failed based at least in part on an amount of time since the status message was received.

The parking brakes referred to herein may correspond to four brakes associated with the four wheels of the vehicle. In other examples, however, any number of parking brakes may be provided corresponding to all or less than all of the wheels of the vehicle. In some examples, a failure associated with more than one of the first communication link, the second communication link, the third communication link, and the fourth communication link may be accompanied by another failure associated with one or more of the first power source, the second power source, the first controller, the second controller, and the third controller. For example, the failure associated with both the first communication link and the second communication link may be caused by the failure associated with the first controller and/or the second controller. The computing device(s) of the vehicle may activate the third controller to provide the command to operate the associated parking brakes.

FIG. 1 illustrates a schematic top view of an example vehicle with various brake units, in accordance with examples of the disclosure. A vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. Since the vehicle 102 may be configured to control all functions from start to stop, it may be unoccupied. However, in other examples, the vehicle 102 may be a fully or partially autonomous vehicle having any other level or classification. The systems and methods described herein may be incorporated into any ground-borne vehicle, including those that are manually driven by a human and those that are partially autonomously controlled, such that they can be autonomously controlled without driver attention or assist during certain driving conditions, for example, while operating on limited-access highways but requiring driver attention and/or assistance.

The vehicle 102 may have four-wheel steering and may operate generally with equal performance characteristics in all directions. The vehicle 102 as illustrated may have four wheels 106. In some examples, the vehicle 102 may operate in a first direction 112. A first end 108 of the vehicle 102 is the front end of the vehicle and a second end 110 of the vehicle 102 is the rear end when the vehicle 102 travels in the first direction 112. In another example, the vehicle 102 may operate in a second direction 114. The second end 110 of vehicle 102 becomes the front end of the vehicle and the first end 108 of the vehicle becomes the rear end of the vehicle when the vehicle travels in the second direction 114. Portions of vehicle 102 may be identified as quadrant portions Q1, Q2, Q3, and Q4, as illustrated in FIG. 1. The first end 108 includes quadrant portions Q1 and Q2 and second end 110 includes quadrant portions Q3 and Q4. The four wheels 106 in this example are associated with the quadrant portions Q1, Q2, Q3, and Q4, respectively.

In some examples, the vehicle 102 may further comprise a redundant parking brake control system 120 to control the parking brake system. The redundant parking brake control system 120 may comprise a primary controller to provide a command to operate the parking brakes and one or more backup controller(s) to operate the parking brakes when the primary controller is unavailable. The computing device(s) of the vehicle 102 may periodically check the status associated with the primary controller. Upon detecting a failure associated with the primary controller, the computing device(s) of the vehicle 102 may activate one of the one or more backup controller(s) to operate the parking brakes.

Figure 2:
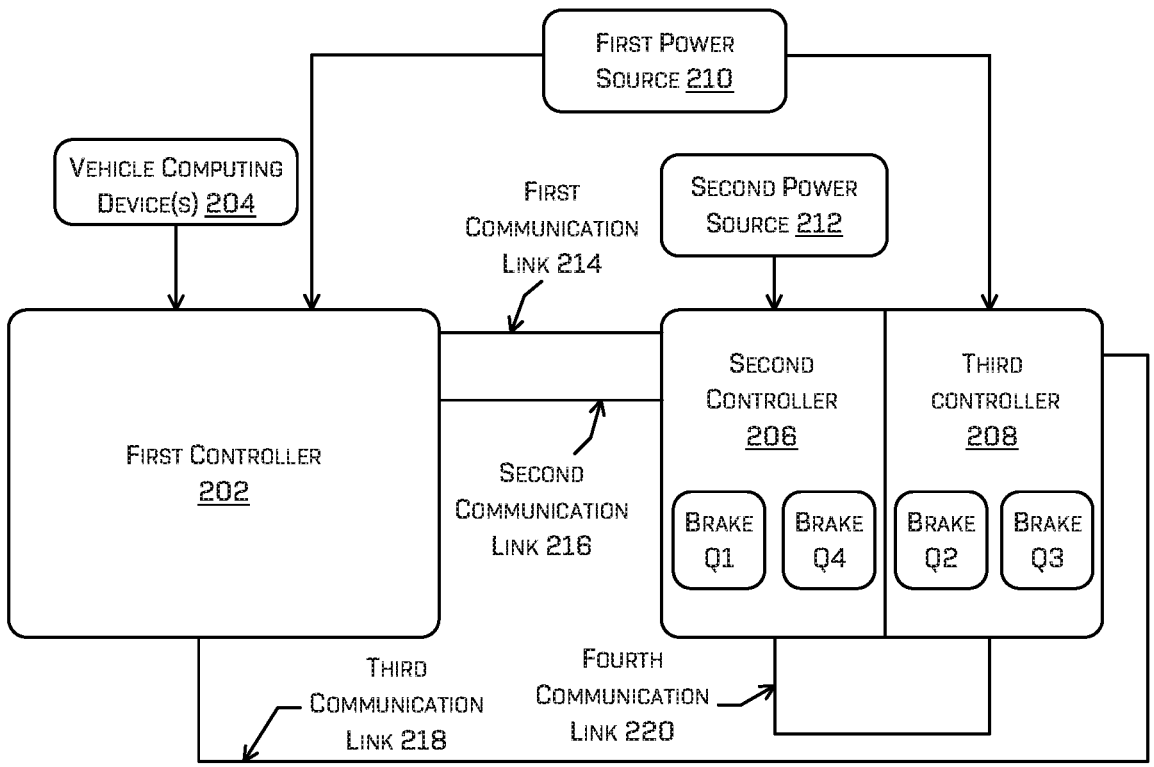
FIG. 2 illustrates a block diagram of an example system for parking brake control provided to the vehicle, in accordance with examples of the disclosure.

FIG. 2 is a block diagram showing a parking brake system of the vehicle 102, which may comprise four brake units including brake Q1, brake Q2, brake Q3, and brake Q4. Each of four brake units in this example may apply to one of the four wheels 106 to hold the vehicle 102 stationary. For example, upon receiving a parking brake control signal the four brake units, namely brake Q1, brake Q2, brake Q3, and brake Q4, may stop the vehicle 102 or hold the vehicle 102 stationary. In some examples, the parking brake control signal may be applied to control the two brake units associated with the rear end of the vehicle 102, e.g., the brake Q3 and the brake Q4 when the vehicle 102 travels in the first direction 112, or the brake Q1 and the brake Q2 when the vehicle travels in the second direction 114. In some examples, the parking brake control signal may be applied to control the two brake units associated with the front end of the vehicle 102, e.g., the brake Q1 and the brake Q2 when the vehicle travels in the first direction 112, or the brake Q3 and the brake Q4 when the vehicle 102 travels in the second direction 114. In some other examples, the parking brake control signal may be applied to control the two brake units diagonally associated with the first end 108 and the second end 110 of the vehicle 102, e.g., the brake Q1 in the first end 108 and the brake Q4 in the second end 110, or the brake Q2 in the first end 108 and the brake Q3 in the second end 110. The computing device(s) of the vehicle may monitor voltage and current of the electric parking brake (EPB) system to determine whether the EPB is working. It should be appreciated that the vehicle 102 shown in FIG. 1 is merely for the illustration purposes, and the systems and methods described herein may be incorporated into vehicles having fewer or a greater number of wheels. Further, the vehicle 102 may be configured to travel in directions other than the first direction 112 and the second direction 114.

The parking brake system may be communicatively coupled to one or more computing device(s) 204 of the vehicle 102. For example, the parking brake system may include a first controller 202 as a primary source to provide a command to operate the parking brake system. The first controller 202 may correspond to the primary controller of the redundant parking brake control system 120 illustrated in FIG. 1. The first controller 202 may be an electric control unit and comprise one or more processors and non-transitory computer readable media storing instructions to operate the parking brake system. The parking brake system may further comprise a second controller 206 as a secondary source to provide the command to operate the parking brake system when the first controller 202 is unavailable. The parking brake system may further comprise a third controller 208 as a tertiary source to provide the command to operate the parking brake system when the first controller 202 and the second controller 206 are both unavailable. The second controller 206 and the third controller 208 may correspond to the backup controller(s) of the redundant parking brake control system 120 illustrated in FIG. 1. The second or third controller may be an electric control unit and comprise one or more processors and non-transitory computer readable media storing instructions to operate the parking brake system. A command to activate the parking brake controller (e.g., the first controller 202, the second controller 206, or the third controller 208) may be generated by a driver or a passenger in the vehicle by operating a button or lever. Additionally, or alternatively, the command to activate the parking brake controller may be generated by the computing device(s) 204 of the vehicle and transmitted to the first controller 202. The first controller 202 may transmit the command to the second controller 206 and the third controller 208 to operate the parking brake units. Further, the command to activate the parking brake controller may be generated by remote computing device(s) that communicate with the computing device(s) of the vehicle via a network. The computing device(s) of the vehicle 102 may determine which controller to be activated based at least in part on the status of the first controller, the second controller, or the third controller.

In some examples, the second controller 206 may be configured to operate the brake Q1 on the first end 108 of the vehicle and the brake Q4 on the second end 110 of the vehicle, where the brake Q1 is at a corner or quadrant diagonally opposite to the corner or quadrant at which the brake Q4 is located. The third controller 208 may be configured to operate the brake Q2 on the first end 108 of the vehicle and the brake Q3 on the second end 110 of the vehicle, where the brake Q2 is at a corner or quadrant diagonally opposite to the corner or quadrant at which brake Q3 is located. In some examples, the second controller 206 and the third controller 208 may be electrically isolated from each other within a same enclosure. The first controller 202 and the third controller 208 may receive power from a first power source 210 and the second controller 206 may receive power from a second power source 212. In some examples, the first power source 210 or the second power source 212 may be a low voltage power input from the on-vehicle batteries. The computing device(s) of the vehicle 102 may periodically transmit a query to the first power source 210 and/or the second power source 212 and receive a response indicating the operation status.

The second controller 206 may be communicatively connected to the first controller 202 through a first communication link 214 or a second communication link 216. The first communication link 214 may operate as a primary bus through which the command to control the parking brake system is received from the first controller 202. The second communication link 216 may operate as a secondary bus when the first communication link 214 is unavailable. In this circumstance, the command to control the parking brake system is received from the first controller 202. The third controller 208 may be communicatively connected to the first controller 202 through a third communication link 218 and communicatively connected to the second controller 206 through a fourth communication link 220. The third communication link 218 may operate as a primary bus through which the command to control the parking brake system is received from the first controller 202. The fourth communication link 220 may operate as a secondary bus when the third communication link 218 is unavailable. In this circumstance, the third controller 208 receives the command to control the parking brake system from the second controller 206 through the fourth communication link 220.

In some examples, the system for parking brake control may further comprise an actuator mechanism (not shown) that upon receiving the control command, operates the parking brakes to clamp or release the brake pads.

It should be appreciated that the system for parking brake control shown in FIG. 2 is merely for the illustration purposes. The system may comprise more or less controllers to operate the parking brakes and each controller may operate one or more brake units other than those illustrated in FIG. 2. Further, the vehicle may travel in directions other than the first direction and the second direction as illustrated in FIG. 1. Thus, the system for parking brake control system may comprise more or less brakes that are disposed in different places of the vehicle (e.g., for vehicle comprising any number of axels).

Various potential failure situations of the parking brake system and the corresponding control schemes are illustrated in FIGS. 3-8 and described herein. By way of example and without limitation, the processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

Figure 3:
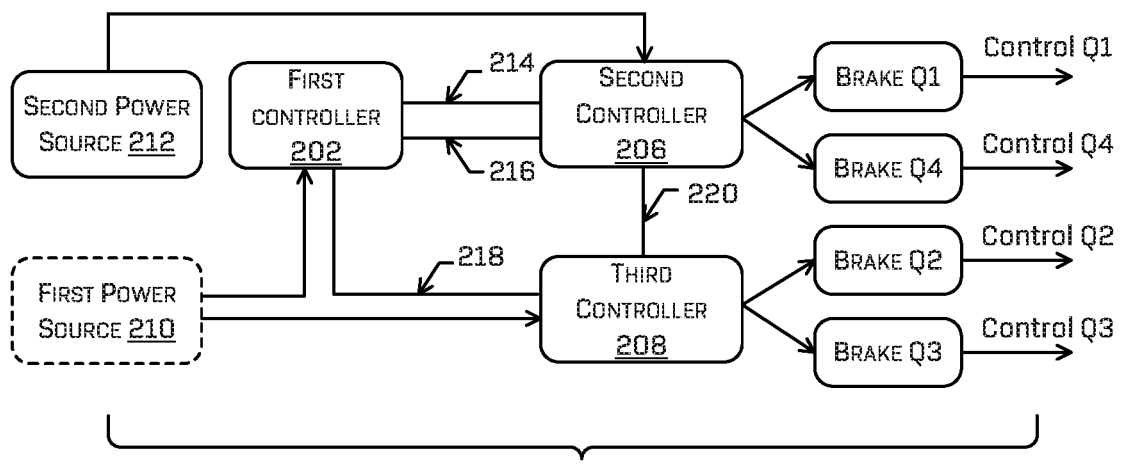
FIG. 3 illustrates a pictorial flow diagram of an example process for parking brake control provided to the vehicle, in accordance with examples of the disclosure.
Figure 3:
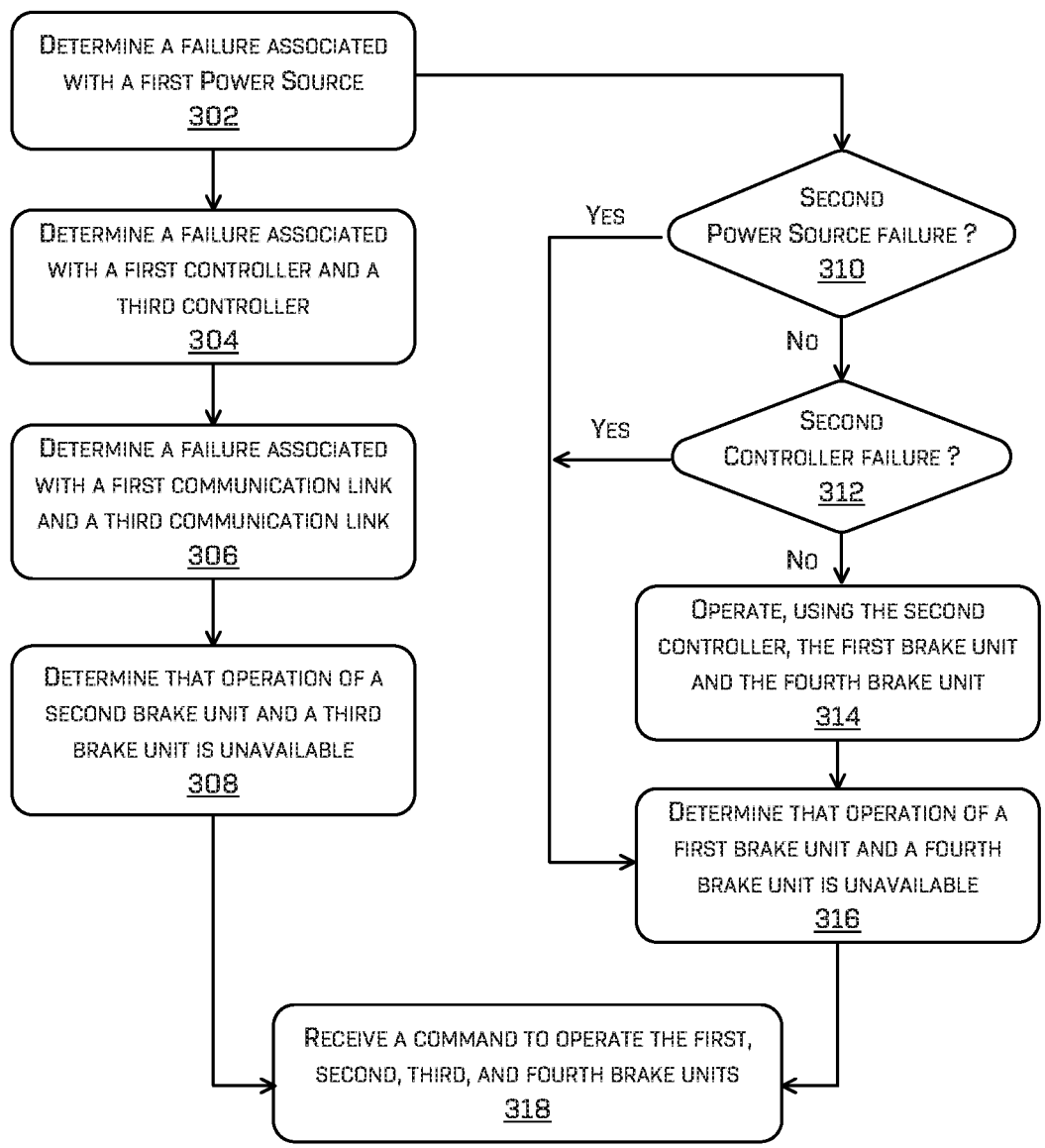

FIG. 3 illustrates a pictorial flow diagram of an example process for parking brake control provided to the vehicle, in accordance with examples of the disclosure. As illustrated in FIG. 3, the first power source 210 may be associated with a failure and the power supplies to the first controller 202 and the third controller 208 may be disconnected. The failure of the first power source 210 may cause the failures associated with the first controller 202 and the third controller 208. Further, the failure associated with the first controller 202 may further cause the first communication link 214 and the second communication link 216 to be unavailable. In that case, even if the second power source 212 operates and supplies power to the second controller 206, the second controller 206 may be unable to receive the control command from the first controller 202 due to the unavailability associated with the first communication link 214 and the second communication link 216. In this circumstance, the computing device(s) of the vehicle may activate the second controller 206 to provide the control command to itself to operate the brake Q1 and the brake Q4. Note that the third communication link 218 and/or the fourth communication link 220 may be available, however, transmitting/receiving the control command may be unavailable due to the failures associated with the first controller 202 and the third controller 208.

At operation 302, the computing device(s) of the vehicle 102 may determine a failure associated with a first power source. In some examples, the computing device(s) of the vehicle 102 may periodically transmit a query to the first power source 210 and/or the second power source 212 and receive responses from the first power source 210 and the second power source 212 indicating the status. When no response is received from the first power source 210 or the second power source 212 in a pre-set time period, the computing device(s) of the vehicle may determine that a failure is associated with the first power source 210 or the second power source 212. In additional, or alternative examples, the computing device(s) may transmit a query to the first and second power sources and receive a response indicating status.

At operation 304, the computing device(s) of the vehicle 102 may determine that a failure is associated with a first controller and a third controller. The failure associated with the first controller 202 and the third controller 208 may be caused by the failure of the first power source 210. The computing device(s) of the vehicle 102 may receive status data indicating the operation status associated with various components of the vehicle 102. When the power supplies to the first controller 202 and the third controller 208 are disconnected due to the failure of the first power source 210, status data indicating the operation status of the first controller 202 and the third controller 208 may be lost. Therefore, if no status data related to the first controller 202 and the third controller 208 is received within a preset time period, the computing device(s) may determine that a failure is associated with the first controller 202 and the third controller 208.

At operation 306, the computing device(s) of the vehicle 102 may determine that a failure is associated with a first communication link and a third communication link. In some examples, the computing device(s) of the vehicle 102 may periodically check the status of the first communication link 214, for example, whether there are messages transmitted through the first communication link 214, (e.g., the primary bus for the second controller 206 to receive the control command from the first controller 202). The messages may include a heartbeat signal, query response, or other signal related to the status of any one or more of the controllers. When no messages are transmitted through the first communication link 214 within a preset time period, the computing device(s) of the vehicle 102 may determine that a failure is associated with a first communication link 214. In some examples, when the computing device(s) of the vehicle 102 determines that the messages transmitted through the first communication link 214 include only heartbeat signals but no control signal, the computing device(s) of the vehicle 102 may stop transmitting the heartbeat signal. Similarly, the computing device(s) of the vehicle 102 may periodically check the status of the third communication link 218, for example, whether there are messages transmitted through the third communication link 218, (e.g., the primary bus for the third controller 208 to receive the control command from the first controller 202). When no messages are transmitted through the third communication link 218 within a preset time period, the computing device(s) of the vehicle 102 may determine that a failure is associated with a third communication link 218.

At operation 308, the computing device(s) of the vehicle 102 may determine that operation of a second brake unit and a third brake unit is unavailable. As the first controller 202 (the primary source to provide a command to control the brakes) and the third controller 208 configured to operate the brake Q2 and the brake Q3 are both in failure due to the failure associated with the first power source 210 in this example, control of the second brake unit (brake Q2) and the third brake unit (brake Q3) is unavailable.

At operation 310, when a failure is associated with a first power source as determined at operation 302, the computing device(s) of the vehicle 102 may determine whether a failure is associated with a second power source. Similar to operation 302, the status of the second power source 212 may be determined base at least in part on the power source data periodically sent from the second power source 212.

At operation 312, when there is no failure associated with the second power source, the computing device(s) of the vehicle 102 may determine whether the second controller is associated with a failure. Similar to operation 304, the status of the second controller 206 may be determined based at least in part on the status data periodically received indicating the operation status of the second controller 206.

At operation 314, when there is no failure associated with the second controller, the computing device(s) of the vehicle 102 may operate, using the second controller, the first brake unit and the fourth brake unit. In some examples, the operation of the first brake unit and the fourth brake unit may cause the brake pads of brake Q1 and brake Q4 to be clamped to hold the vehicle stationary. In some examples, the operation of the first brake unit and the fourth brake unit may cause the brake pads of the brake Q1 and the brake Q4 to be released to allow the vehicle to move. By operating the second controller 206 as a secondary source to provide a control command when the first controller 202 is associated with a failure, the vehicle 102 may be able to stop during an emergency.

At operation 316, when there is a failure associated with the second power source and/or there is a failure associated with the second controller, the computing device(s) of the vehicle 102 may determine that operation of a first brake unit and a fourth brake unit is unavailable. In some examples, when the operation of the first brake unit (brake Q1) and the fourth brake unit (brake Q4) is unavailable, the brake Q1 and the brake Q4 may maintain a current status, for example, an open status that allows the vehicle 102 to move or a closed status that causes the vehicle 102 to stop.

At operation 318, when the second controller is unable to operate brake Q1 and brake Q4 and the third controller is unable to operate Q2 and Q3, the computing device(s) of the vehicle 102 may issue a command to operate any one or more of brake Q1, brake Q2, brake Q3 or brake Q4 to allow the vehicle to move or cause the vehicle to stop. In some examples, in the event of a failure of the first, second, and third controllers, the brake units may remain in their last state (e.g., either open, partially engaged, or fully engaged).

Figure 4:
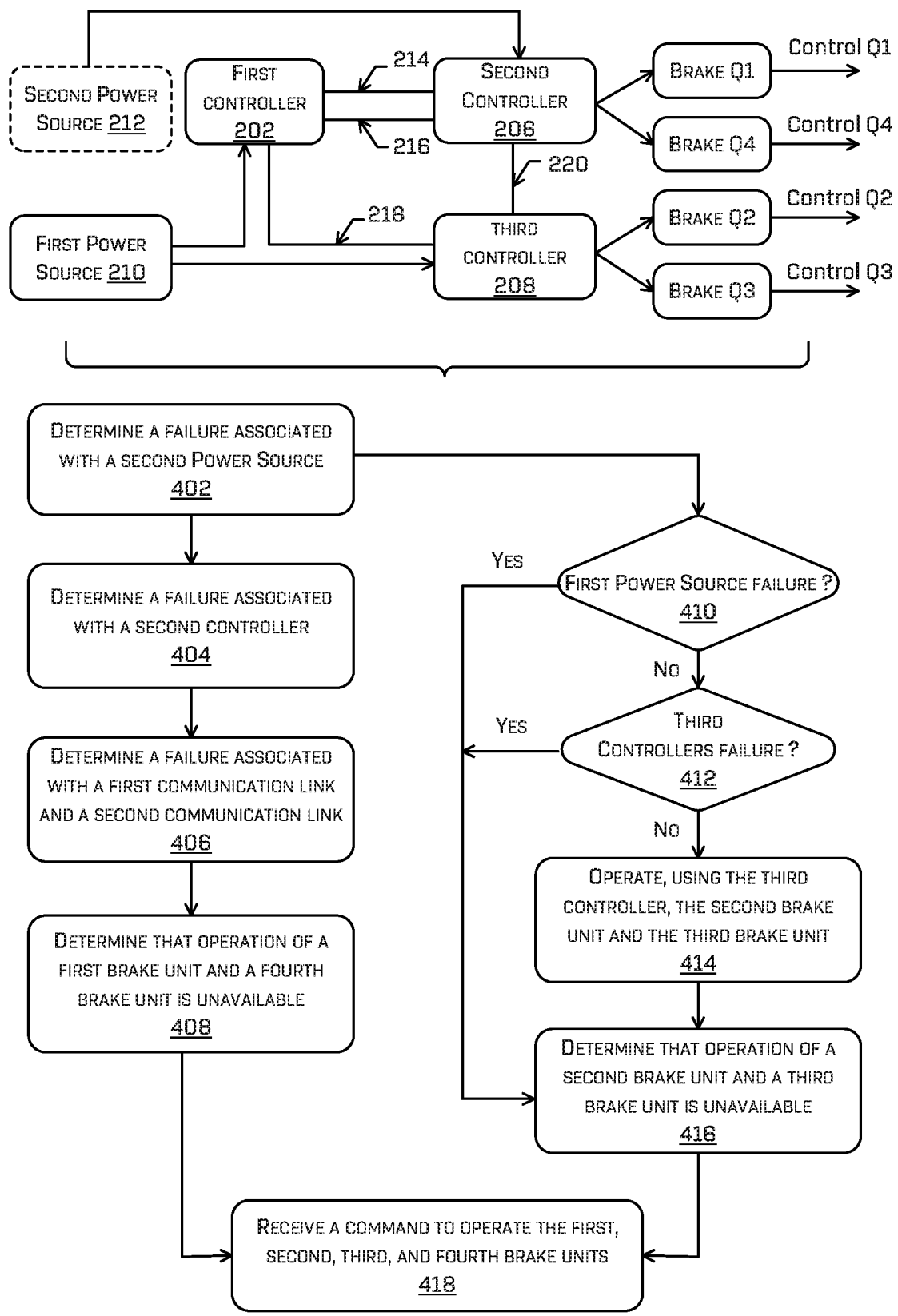
FIG. 4 illustrates a pictorial flow diagram of another example process for parking brake control provided to the vehicle, in accordance with examples of the disclosure.

FIG. 4 illustrates a pictorial flow diagram of another example process for parking brake control provided to the vehicle, in accordance with examples of the disclosure. As illustrated in FIG. 4, the second power source 212 may be associated with a failure and the power supplies to the second controller 206 may be disconnected. The failure of the second power source 212 may cause the failures associated with the second controller 206. Further, the failure associated with the second controller 206 may further cause the first communication link 214 and the second communication 216 unavailable. Therefore, the control of the brake Q1 and the brake Q4 through the second controller 206 may be lost. In this circumstance, the first controller 202 may provide the control command to the third controller 208 to operate the brake Q2 and the brake Q3. Note that the third communication link 218 may be available, however, transmitting/receiving the control command from the second controller 206 to the third controller 208 may be unavailable due to the failures associated with the second controller 206.

At operation 402, the computing device(s) of the vehicle 102 may determine a failure associated with a second power source. Similar to operation 302 and operation 310 in FIG. 3, the status of the second power source 212 may be determined base at least in part on the power source data periodically sent from the second power source 212.

At operation 404, the computing device(s) of the vehicle 102 may determine a failure associated with a second controller. Similar to operation 304 in FIG. 3, the computing device(s) of the vehicle 102 may receive status data indicating the operation status associated with various components of the vehicle 102. When the power supplies to the second controller 206 is disconnected due to the failure of the second power source 212, status data indicating the operation status of second controller 206 may be lost. Therefore, if no status data related to the second controller 206 is received within a pre-set time period, the computing device(s) may determine that a failure is associated with the second controller 206.

At operation 406, the computing device(s) of the vehicle 102 may determine a failure associated with a first communication link and a second communication link. Similar to operation 306 in FIG. 3, the computing device(s) of the vehicle 102 may periodically check the status of the first communication link 214 and the second communication link 216. When no messages are transmitted through the first communication link 214 and the second communication link 216 in several time cycles, the computing device(s) of the vehicle 102 may determine that a failure is associated with the first communication link 214 and the second communication link 216.

At operation 408, the computing device(s) of the vehicle 102 may determine that operation of a first brake unit and a fourth brake unit is unavailable. As the second controller 206 loses power supply from the second power source 212, even though the first controller 202 still operates, the control of the first brake unit (brake Q1) and the fourth brake unit (brake Q4) is unavailable.

At operation 410, the computing device(s) of the vehicle 102 may determine whether a failure is associated with a first power source. In some examples, the status of the first power source 210 may be determined base at least in part on the power source data periodically sent from the first power source 210.

At operation 412, when there is no failure associated with the first power source, the computing device(s) of the vehicle 102 may determine whether a third controller is associated with a failure. In some examples, the status of the first controller 202 and the third controller 208 may be determined based at least in part on the status data periodically received indicating the operation status of the first controller 202 and the third controller 208.

At operation 414, when there is no failure associated with the third controller, the computing device(s) of the vehicle 102 may operate, using the third controller, the second brake unit and the third brake unit. In some examples, the operation of the second brake unit and the third brake unit may cause the brake pads being clamped to the second brake unit (brake Q2) and the third brake unit (brake Q3) to hold the vehicle stationary. In some examples, the operation of the second brake unit and the third brake unit may cause the brake pads being released from the second brake unit (brake Q2) and the third brake unit (brake Q3) to allow the vehicle to move. Note that the third controller 208 operates as a tertiary source to provide the control command. Regardless of whether the failures are associated with the first controller 202 and/or the second controller 206, the third controller 208 can still operate the brake Q2 and the brake Q3 to stop or hold the vehicle during an emergency.

At operation 416, when there is a failure associated with the first power source, the computing device(s) of the vehicle 102 may determine that operation of a second brake unit and a third brake unit is unavailable. In some examples, when the operation of the second brake unit (brake Q2) and the third brake unit (brake Q3) is unavailable, the brake Q2 and the brake Q3 may maintain a current status.

At operation 418, when there is a failure associated with the second controller and the third controller, the computing device(s) of the vehicle 102 may issue a command to operate any one or more of the first unit (brake Q1), the second brake unit (brake Q2), the third brake unit (brake Q3) or the fourth brake unit (brake Q4) to allow the vehicle to move or cause the vehicle to stop.

Figure 5:
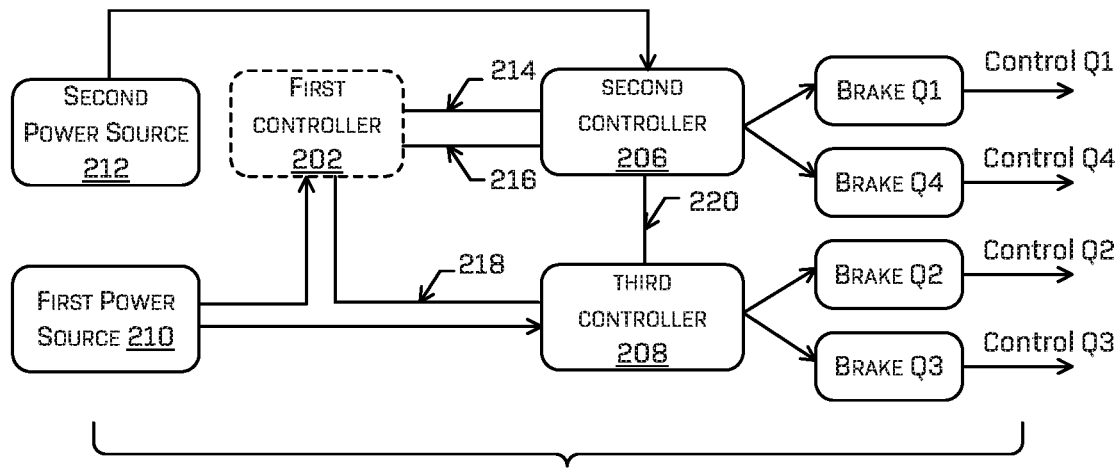
FIG. 5 illustrates a pictorial flow diagram of another example process for parking brake control provided to the vehicle, in accordance with examples of the disclosure.
Figure 5:
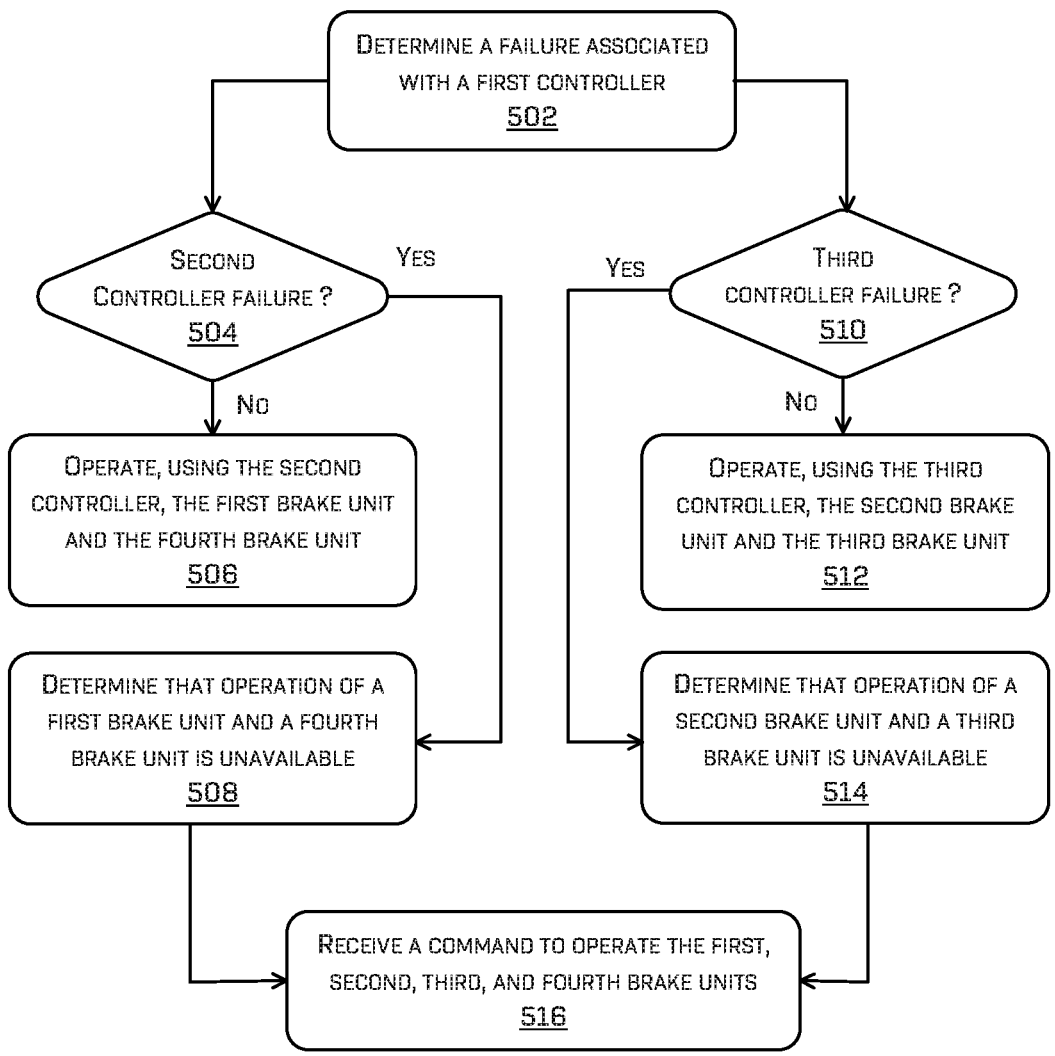

FIG. 5 illustrates a pictorial flow diagram of another example process for parking brake control provided to the vehicle, in accordance with examples of the disclosure. As illustrated in FIG. 5, the first controller 202 may be associated with a failure. In some examples, in addition to the failure of the first power source 210, other factors may cause the first controller 202 unable to operate, such as, programmable software failure, short circuit, physical damage on the components of the first controller 202, etc. In such circumstance, the computing device(s) of the vehicle 102 may activate the second controller 206 to provide the control command to itself and the third controller 208.

At operation 502, the computing device(s) of the vehicle 102 may determine a failure associated with a first controller. In some examples, the failure associated with the first controller 202 may cause failures associated with the first communication link 214 and the second communication link 216. The failure associated with the first controller 202 may further cause a failure associated with the third communication link 218. In other examples, regardless the failure associated with the first controller 202, the second controller 206 may transmit messages to the first controller via the first communication link 214 and the second communication link 216, and the third controller 208 may transmit messages to the first controller via the third communication link 218.

At operation 504, the computing device(s) of the vehicle 102 may determine whether a failure is associated with a second controller. Whether a failure is associated with the second controller 206 may be determined based at least in part on the status data related to the second controller 206.

At operation 506, when there is no failure associated with the second controller, the computing device(s) of the vehicle 102 may operate, using the second controller, the first brake unit and the fourth brake unit. As the first controller 202 is unavailable to provide a control command to operate various brake units, the computing device(s) of the vehicle 102 may activate the second controller 206 to provide the control command to itself to operate the first brake unit (brake Q1) and the fourth brake unit (brake Q4). The operation of the brake Q1 and the brake Q4 may hold the vehicle 102 stationary. Note that the second controller 206 and the third controller 208 operate individual brake units, respectively. Even though a failure is associated with the first controller 202, the computing device(s) of the vehicle 102 can activate the second controller 206 to operate the brake Q1 and the brake Q4 to hold the vehicle stationary during the emergency.

At operation 508, when there is a failure associated with the second controller, the computing device(s) of the vehicle 102 may determine that operation of the first brake unit and the fourth brake unit is unavailable. In some examples, when the operation of the first brake unit (brake Q1) and the fourth brake unit (brake Q4) is unavailable, the brake Q1 and the brake Q4 may maintain a current status. In some examples, the failure associated with the second controller 206 may further cause the fourth communication link 220 unavailable to transmit the control command to the third controller 208.

At operation 510, the computing device(s) of the vehicle 102 may determine whether a failure is associated with a third controller. Whether a failure is associated with the third controller 208 may be determined based at least in part on the status data related to the second controller 208.

At operation 512, when there is no failure associated with the third controller, the computing device(s) of the vehicle 102 may operate, using the third controller, the second brake unit and the third brake unit. As set forth above, the third controller 208 may operate as a tertiary source to provide the command to operate the parking brake system. When both of the first controller 202 and the second controller 206 are associated with a failure, the computing device(s) of the vehicle 102 may activate the third controller 208 to provide the command to itself to operate the second brake unit (brake Q2) and the third brake unit (brake Q3) during an emergency. When the first controller 202 is associated with a failure while the second controller 206 operates, the computing device(s) of the vehicle 102 may activate the second controller 206 to provide the control command to itself to operate the brake Q1 and the brake Q4 and provide the control command to the third controller 208 to operate the brake Q2 and the brake Q3.

At operation 514, when there is a failure associated with the third controller, the computing device(s) of the vehicle 102 may determine that operation of a second brake unit and a third brake unit is unavailable. Therefore, the second brake unit (brake Q2) and the third brake unit (brake Q3) may maintain a current status until the failure associated with the third controller is resolved.

At operation 516, when there is a failure associated with the second controller and the third controller, the computing device(s) of the vehicle 102 may issue a command to operate any one or more of the first unit (brake Q1), the second brake unit (brake Q2), the third brake unit (brake Q3) or the fourth brake unit (brake Q4) to allow the vehicle to move or cause the vehicle to stop.

Figure 6:
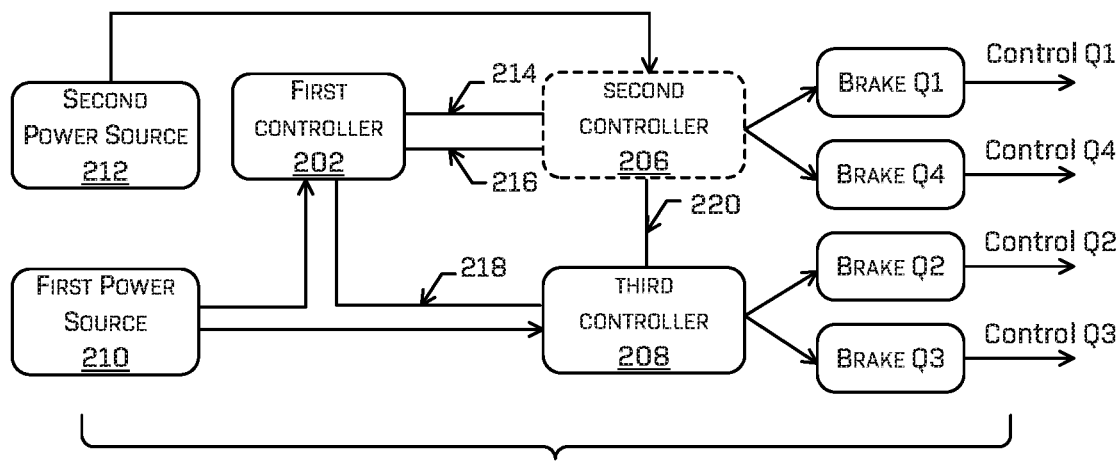
FIG. 6 illustrates a pictorial flow diagram of another example process for parking brake control provided to the vehicle, in accordance with examples of the disclosure.
Figure 6:
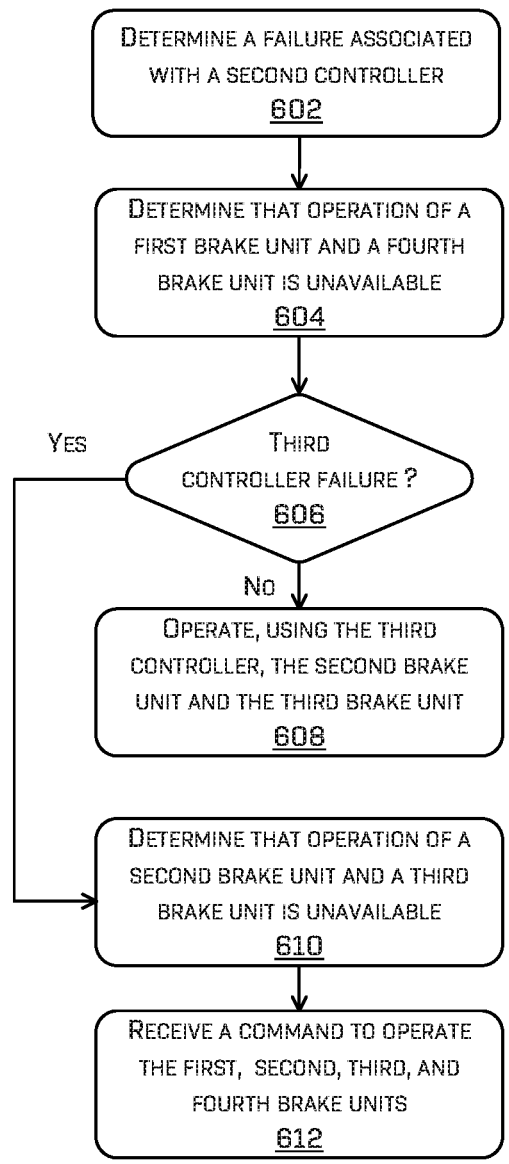

FIG. 6 illustrates a pictorial flow diagram of another example process for parking brake control provided to the vehicle, in accordance with examples of the disclosure. As illustrated in FIG. 6, the second controller 206 may be associated with a failure. In some examples, in addition to the failure of the second power source 212, other factors may cause the second controller 206 unable to operate, such as, programmable software failure, short circuit, physical damage on the components of the second controller 206, etc. In such circumstance, the first controller 202 may still operate as a primary source to transmit the control command to the second controller 206 via the first communication link 214 and/or the second communication link 216 and transmit the control command to the third controller 208 via the third communication link 218. However, due to the failure of the second controller 206, the control of the brake Q1 and the brake Q4 may be unavailable.

At operation 602, the computing device(s) of the vehicle 102 may determine that a failure is associated with a second controller. In some examples, the second controller 206 may transmit status data or a status signal to the computing device(s) periodically. For example, the second controller 206 may generate a single bit "1" or a heartbeat signal indicating a normal operating status. When the single bit "1" or the heartbeat signal is not received within a pre-set time period, the computing device(s) of the vehicle 102 may determine that a failure is associated with the second controller 206. In some examples, the failure associated with the second controller 206 may cause failures associated with the first communication link 214 and the second communication link 216. The failure associated with the second controller 206 may further cause a failure associated with the fourth communication link 220. In other examples, regardless the failure associated with the second controller 206, the first controller 202 may transmit the control signal to the second controller 206 via the first communication link 214 and/or the second communication link 216 and transmit the control signal to the third controller 208 via the third communication link 218.

At operation 604, the computing device(s) of the vehicle 102 may determine that operation of a first brake unit and a fourth brake unit is unavailable. Although the first controller 202 may still provide the control command to the second controller 206 and the third controller 208, due to the failures associated with the second controller 206, the control of the first brake unit, (brake Q1), and the fourth brake unit (brake Q4) may be unavailable.

At operation 606, the computing device(s) of the vehicle 102 may determine whether a failure is associated with a third controller. Similar to operation 602, the status of the third controller may be determined based at least in part on the status data or status signal generated by the third controller 208.

At operation 608, when there is no failure associated with the third controller, the computing device(s) of the vehicle 102 may operate, using the third controller, the second brake unit and the third brake unit. As the first controller 202 operates, the third communication link 218 is capable of transmitting the control command from the first controller 202 to the third controller 208 to control the second brake unit (brake Q2) and the third brake unit (brake Q3). Therefore, when there is an emergency occurred in the environment of the vehicle 102 that requires the vehicle 102 to hold stationary, even though the control of the brake Q1 and the brake Q4 is lost due to the failure associated with the second controller 206, the computing device(s) of the vehicle 102 can activate the third controller 208 to operate the brake Q2 and the brake Q3 to hold the vehicle stationary.

At operation 610, when there is a failure associated with the third controller, the computing device(s) of the vehicle 102 may determine that operation of the second brake unit and the third brake unit is unavailable.

At operation 612, when there is a failure associated with the second controller and the third controller, the computing device(s) of the vehicle 102 may issue a command to operate any one or more of the first unit (brake Q1), the second brake unit (brake Q2), the third brake unit (brake Q3) or the fourth brake unit (brake Q4) to allow the vehicle to move or cause the vehicle to stop.

Figure 7:
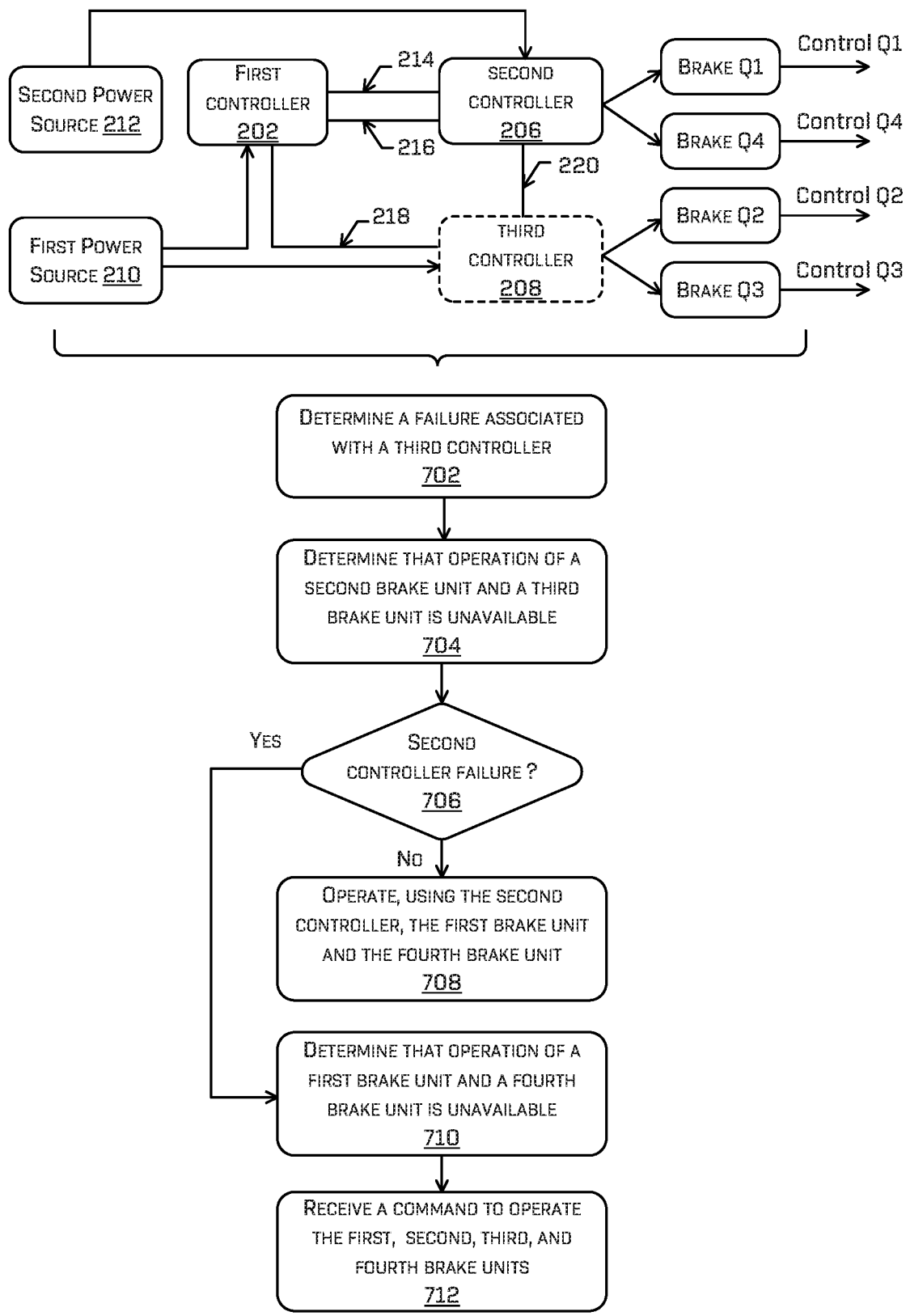
FIG. 7 illustrates a pictorial flow diagram of another example process for parking brake control provided to the vehicle, in accordance with examples of the disclosure.

FIG. 7 illustrates a pictorial flow diagram of another example process for parking brake control provided to the vehicle, in accordance with examples of the disclosure. As illustrated in FIG. 7, the third controller 208 may be associated with a failure. In some examples, in addition to the failure of the first power source 210, other factors may cause the third controller 208 unable to operate, such as, programmable software failure, short circuit, physical damage on the components of the third controller 208, etc. In such circumstance, the first controller 202 may still operate as a primary source to provide the control command to the second controller 206 and the third controller 208. However, due to the failure of the third controller 208, the control of the brake Q2 and the brake Q3 may be unavailable.

At operation 702, the computing device(s) of the vehicle 102 may determine that a failure is associated with a third controller. Similar to operation 602, the status of the third controller 208 may be determined based at least in part on the status data or status signal generated by the third controller 208. In some examples, the failure associated with third controller 208 may cause failures associated with the third communication link 218 and the fourth communication link 220. In other examples, regardless of the failure associated with third controller 208, the first controller 202 may transmit the control signal to the third controller 208 via the third communication link 218 and the second controller 206 may transmit the control signal to the third controller 208 via the fourth communication link 220.

At operation 704, the computing device(s) of the vehicle 102 may determine that operation of a second brake unit and a third brake unit is unavailable. In some examples, although the first controller 202 may provide the control command to the second controller 206 and the third controller 208, due to the failures associated with the third controller 208, the third communication link 218, and the fourth communication link 220, the control of the second brake unit (brake Q2) and the third brake unit (brake Q3) may be unavailable. In other examples, the third communication link 218, and the fourth communication link 220 may be not associated with a failure, however, due to the unavailability of transmitting/receiving the control command through the third communication link 218, and the fourth communication link 220, the control of the second brake unit (brake Q2) and the third brake unit (brake Q3) may be unavailable.

At operation 706, the computing device(s) of the vehicle 102 may determine whether a failure is associated with a second controller. Similar to operation 702, the status of the second controller may be determined based at least in part on the status data or status signal generated by the second controller 206.

At operation 708, when there is no failure associated with the second controller, the computing device(s) of the vehicle 102 may operate, using the second controller, the first brake unit and the fourth brake unit. As the first controller 202 operates, the first communication link 214 and the second communication link 216 are capable of transmitting the control command from the first controller 202 to the second controller 206 to control the first brake unit (brake Q1) and the fourth brake unit (brake Q4). Therefore, when there is an emergency that requires the vehicle 102 to hold stationary, even though the control of the brake Q2 and the brake Q3 is lost due to the failure associated with the third controller 208, the computing device(s) of the vehicle 102 may activate the second controller 206 to operate the brake Q1 and the brake Q4 to hold the vehicle 102 stationary.

At operation 710, when there is a failure associated with the second controller, the computing device(s) of the vehicle 102 may determine that operation of the first brake unit and the fourth brake unit is unavailable.

At operation 712, when there is a failure associated with the second controller and the third controller, the computing device(s) of the vehicle 102 may issue a command to operate any one or more of the first unit (brake Q1), the second brake unit (brake Q2), the third brake unit (brake Q3) or the fourth brake unit (brake Q4) to allow the vehicle to move or cause the vehicle to stop.

Figure 8:
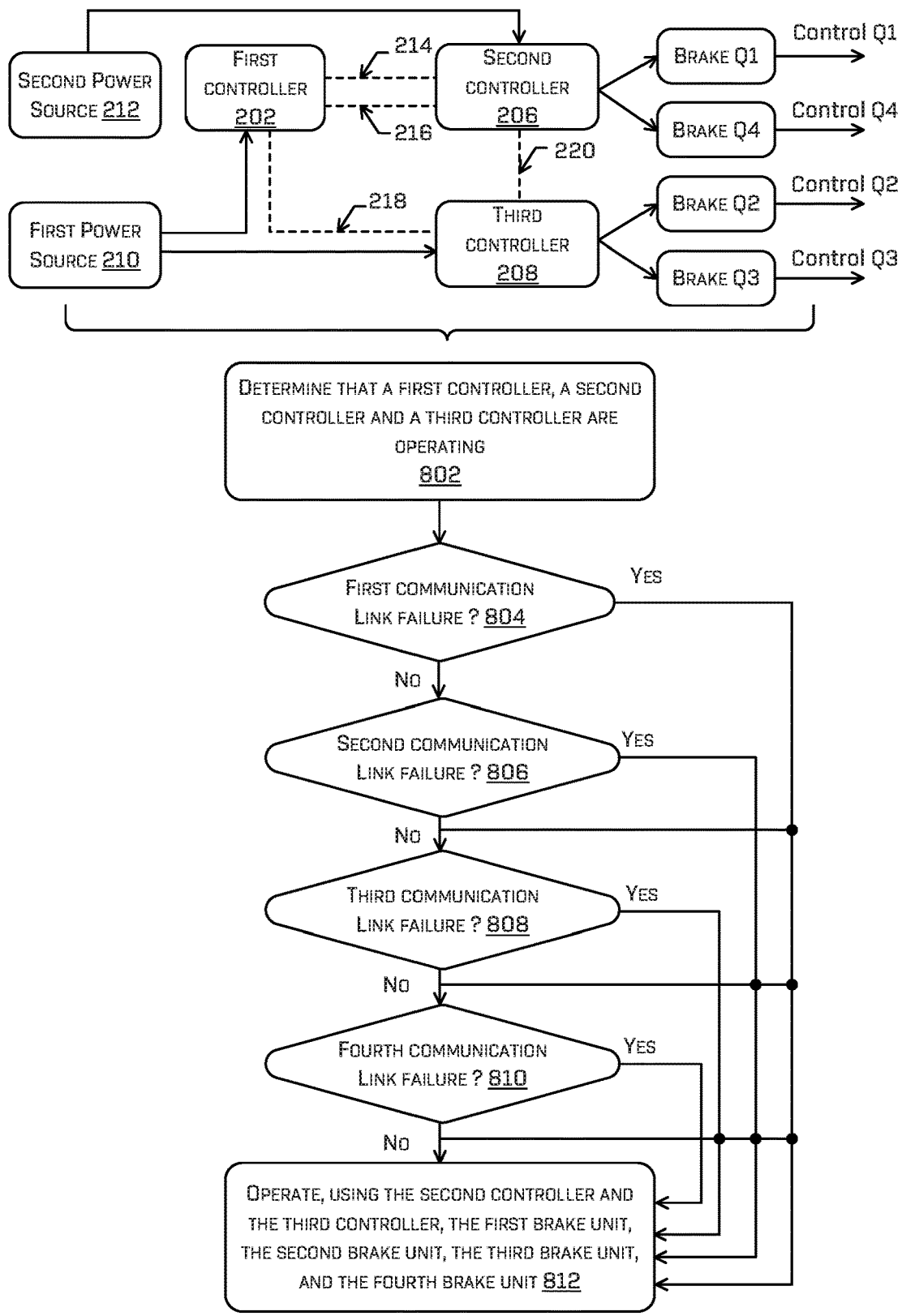
FIG. 8 illustrates a pictorial flow diagram of another example process for parking brake control provided to the vehicle, in accordance with examples of the disclosure.

FIG. 8 illustrates a pictorial flow diagram of another example process for parking brake control provided to the vehicle, in accordance with examples of the disclosure. As illustrated in FIG. 8, one or more of the first communication link 214, the second communication link 216, the third communication link 218, and the fourth communication link 220 may be associated with a failure, causing inability to transmit or receive the control command. In some examples, the failure associated with any of the communication links may not cause the control of the various brake units to be lost. In other examples, when there is a failure associated with one or more of the first controller 202, the second controller 206, and the third controller 208, the failure associated with any of the communication links, the control of the various brake units may be unavailable.

At operation 802, the computing device(s) of the vehicle 102 may determine that a first controller 202, a second controller 206, and a third controller 208 are operating. The computing device(s) of the vehicle 102 may determine the status of the first controller 202, the second controller 206, and the third controller 208 based at least in part on the status data or the status signal generated by each of the first controller 202, the second controller 206, and the third controller 208.

At operation 804, the computing device(s) of the vehicle 102 may determine whether a failure is associated with the first communication link. At operation 806, the computing device(s) of the vehicle 102 may determine whether a failure is associated with the second communication link. At operation 808, the computing device(s) of the vehicle 102 may determine whether a failure is associated with the third communication link. At operation 810, the computing device(s) of the vehicle 102 may determine whether a failure is associated with the fourth communication link. In some examples, the computing device(s) of the vehicle 102 may periodically check the status of the first communication link 214, the second communication link 216, the third communication link 218, and the fourth communication link 220. The computing device(s) of the vehicle 102 may check whether a heartbeat signal and/or a control signal are transmitted over the communication links. When only heartbeat signals but not control signals are transmitted through one or more of the first communication link 214, the second communication link 216, the third communication link 218, and the fourth communication link 220 within a pre-set time period, the computing device(s) of the vehicle 102 may determine that a failure is associated with one or more of the first controller 202, the second controller 206 and the third controller 208. When no heartbeat signals and control signals are transmitted through one or more of the first communication link 214, the second communication link 216, the third communication link 218, and the fourth communication link 220 within a pre-set time period, the computing device(s) of the vehicle 102 may determine that a failure is associated with one or more of the first communication link 214, the second communication link 216, the third communication link 218, and the fourth communication link 220. Further, the vehicle 102 may comprise additional signaling pathways for messages (e.g., exclusive of brake control messages). In such a case, the vehicle 102 may determine disambiguate between a failure of a communication link and a failure of a controller.

At operation 812, when only one of the first communication link 214, the second communication link 216, the third communication link 218, and the fourth communication link 220 is associated with a failure, the computing device(s) of the vehicle 102 can activate the first controller 202 to transmit a command to the second controller 206 to operate the brake Q1 and the brake Q4, and to the third controller 208 to operate the brake Q2 and the brake Q3 to hold the vehicle stationary.

Figure 9:
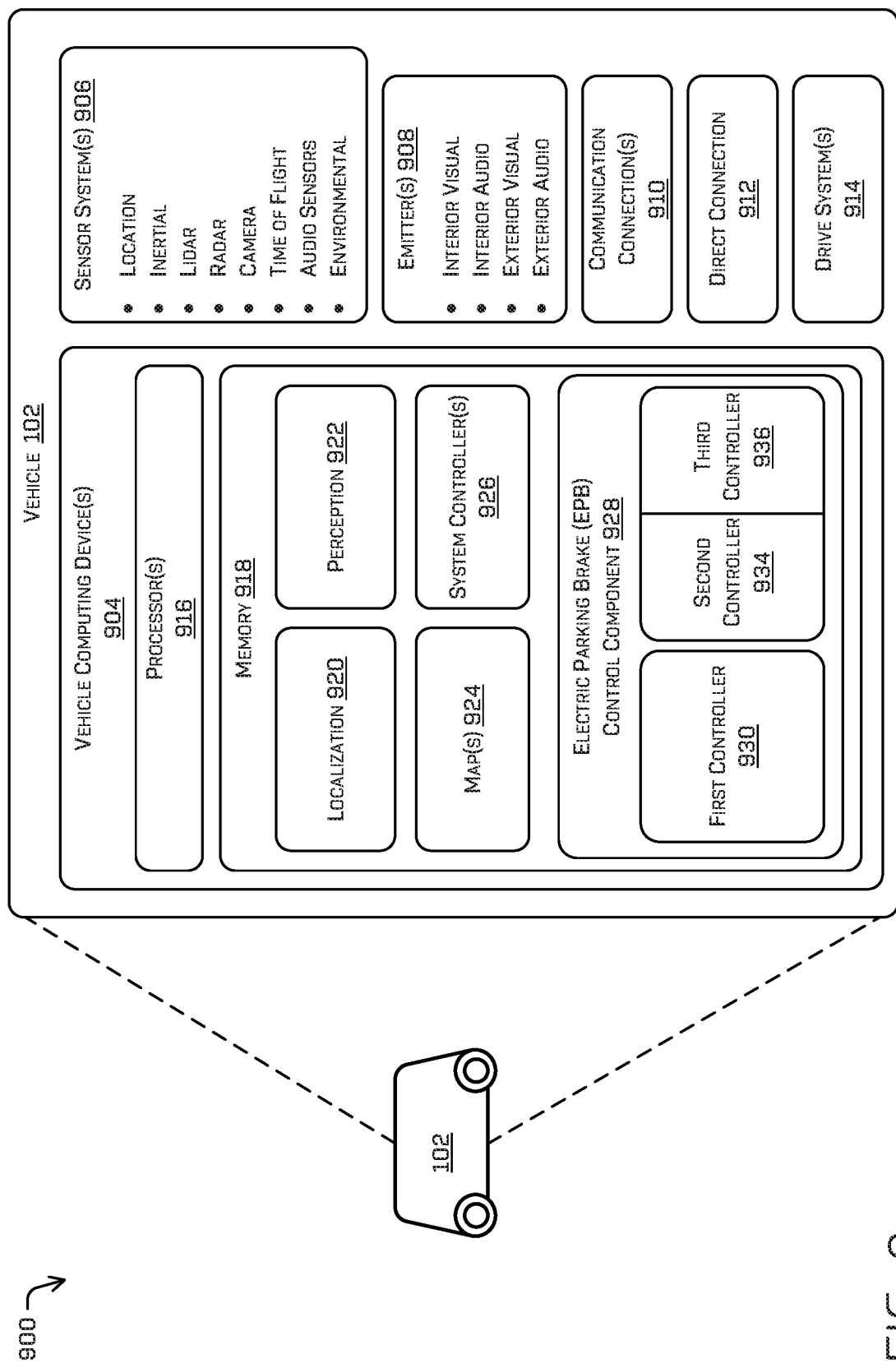
FIG. 9 illustrates a block diagram of an example system for implementing the various brake units and the parking brake controls as described herein.

FIG. 9 illustrates a block diagram of an example system 900 for implementing the various brake units and the parking brake controls as described herein. The vehicle 102 may include one or more vehicle computing devices 904, one or more sensor systems 906, one or more emitters 908, one or more communication connections 910, at least one direct connection 912, and one or more drive systems 914.

The vehicle computing device 904 may include one or more processors 916 and memory 918 communicatively coupled with the one or more processor(s) 916. In the illustrated example, the vehicle 102 is an autonomous vehicle; however, the vehicle 102 could be any other type of vehicle. In the illustrated example, the memory 918 of the vehicle computing device 904 stores a localization component 920, a perception component 922, one or more maps 924, one or more system controllers 926, an electric parking brake (EPB) control component 928 comprising at least a first controller 930, a second controller 934, and a third controller 936. Though depicted in FIG. 9 as residing in memory 918 for illustrative purposes, it is contemplated that the localization component 920, the perception component 922, the one or more maps 924, the one or more system controllers 926, electric parking brake (EPB) control component 928, the first controller 930, the second controller 934 and a third controller 936 may additionally, or alternatively, be accessible to the vehicle 102 (e.g., stored remotely).

In at least one example, the localization component 920 may include functionality to receive data from the sensor system(s) 906 to determine a position and/or orientation of the vehicle 102 (e.g., one or more of an x-, y-, z-position, roll, pitch, or yaw). For example, the localization component 920 may include and/or request/receive a map of an environment and may continuously determine a location and/or orientation of the autonomous vehicle within the map. In some instances, the localization component 920 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 920 may provide data to various components of the vehicle 102 to determine an initial position of an autonomous vehicle for generating a trajectory and/or for generating or receiving map data, as discussed herein.

In some instances, the perception component 922 may include functionality to perform object detection, segmentation, and/or classification. In some examples, the perception component 922 may provide processed sensor data that indicates a presence of an entity that is proximate to the vehicle 102 and/or a classification of the entity as an entity type (e.g., car, pedestrian, cyclist, animal, building, tree, road surface, curb, sidewalk, unknown, etc.). In additional or alternative examples, the perception component 922 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The memory 918 may further include one or more maps 924 that may be used by the vehicle 102 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps 924 may include at least one map (e.g., images and/or a mesh). In some examples, the vehicle 102 may be controlled based at least in part on the map(s) 924. In some examples, the one or more maps 924 may be stored on a remote computing device(s). In some examples, multiple maps 924 may be stored based on, for example, a characteristic (e.g., type of entity, time of day, day of week, season of the year, etc.). Storing multiple maps 924 may have similar memory requirements but increase the speed at which data in a map may be accessed.

In at least one example, the vehicle computing device 904 may include one or more system controllers 926, which may be configured to control steering, propulsion, braking, safety, emitters, communication, and other systems of the vehicle 102. These system controller(s) 926 may communicate with and/or control corresponding systems of the drive system(s) 914 and/or other components of the vehicle 102.

The electric parking brake (EPB) control component 928 may correspond to the redundant parking brake control system 120 illustrated in FIG. 1. In some examples, the first controller 930 may operate as a primary source to provide a control command to the second controller 934 and the third controller 936 to operate various brake units. The first controller 930 may correspond to the first controller 202 illustrated in FIG. 2. The second controller 934 may correspond to the second controller 206 illustrated in FIG. 2. The third controller 936 may correspond to the third controller 208 illustrated in FIG. 2.

In some instances, aspects of some or all of the components discussed herein may include any models, algorithms, and/or machine learning algorithms. For example, in some instances, the components in the memory 918 may be implemented as a neural network.

As described herein, an exemplary neural network is a biologically inspired algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 906 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, wheel encoders, environment sensors (e.g., temperature sensors, humidity sensors, light sensors, pressure sensors, etc.), etc. The sensor system(s) 906 may include multiple instances of each of these or other types of sensors. For instance, the lidar sensors may include individual lidar sensors located at the corners, front, back, sides, and/or top of the vehicle 102. As another example, the camera sensors may include multiple cameras disposed at various locations about the exterior and/or interior of the vehicle 102. The sensor system(s) 906 may provide input to the vehicle computing device 904. Additionally, or alternatively, the sensor system(s) 906 may send sensor data, via the one or more networks, to the one or more computing device(s) at a particular frequency, after a lapse of a predetermined period of time, in near real-time, etc.

The vehicle 102 may also include one or more emitters 908 for emitting light and/or sound, as described above. The emitters 908 in this example include interior audio and visual emitters to communicate with passengers of the vehicle 102. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 908 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 102 may also include one or more communication connection(s) 910 that enable communication between the vehicle 102 and one or more other local or remote computing device(s). For instance, the communication connection(s) 910 may facilitate communication with other local computing device(s) on the vehicle 102 and/or the drive system(s) 914. Also, the communication connection(s) 910 may allow the vehicle to communicate with other nearby computing device(s) (e.g., other nearby vehicles, traffic signals, etc.). The communications connection(s) 910 also enable the vehicle 102 to communicate with a remote teleoperation computing device or other remote services.

The communications connection(s) 910 may include physical and/or logical interfaces for connecting the vehicle computing device 904 to another computing device or a network. For example, the communications connection(s) 910 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 102 may include one or more drive systems 914. In some examples, the vehicle 102 may have a single drive system 914. In at least one example, if the vehicle 102 has multiple drive systems 914, individual drive systems 914 may be positioned on opposite ends of the vehicle 102 (e.g., the front and the rear, etc.). In at least one example, the drive system(s) 914 may include one or more sensor systems to detect conditions of the drive system(s) 914 and/or the surroundings of the vehicle 102. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 914. In some cases, the sensor system(s) on the drive system(s) 914 may overlap or supplement corresponding systems of the vehicle 102 (e.g., sensor system(s) 906).

The drive system(s) 914 may include many of the vehicle systems, including a high voltage power source, a motor to propel the vehicle, an inverter to convert direct current from the power source into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 914 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 914. Furthermore, the drive system(s) 914 also include one or more communication connection(s) that enable communication by the respective drive system with one or more other local or remote computing device(s).

In at least one example, the direct connection 912 may provide a physical interface to couple the one or more drive system(s) 914 with the body of the vehicle 102. For example, the direct connection 912 may allow the transfer of energy, fluids, air, data, etc. between the drive system(s) 914 and the vehicle. In some instances, the direct connection 912 may further releasably secure the drive system(s) 914 to the body of the vehicle 102.

The processor(s) 916 of the vehicle 102 may be any suitable processor capable of executing instructions to process data and perform operations as described herein. By way of example and not limitation, the processor(s) 916 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 918 may be examples of non-transitory computer-readable media. The memory 918 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 918 may include at least a working memory and a storage memory. For example, the working memory may be a high-speed memory of limited capacity (e.g., cache memory) that is used for storing data to be operated on by the processor(s) 916. In some instances, the memory 918 may include a storage memory that may be a lower-speed memory of relatively large capacity that is used for long-term storage of data. In some cases, the processor(s) 916 may not operate directly on data that is stored in the storage memory, and data may need to be loaded into a working memory for performing operations based on the data, as discussed herein.

EXAMPLE CLAUSES

A. A vehicle comprising: a first brake unit; a second brake unit; a third brake unit; a fourth brake unit; a first controller powered by a first power source; a second controller powered by a second power source and communicatively coupled to the first controller via a first and second communication link; and a third controller powered by the first power source and communicatively coupled to the first controller via a third communication link and to the second controller via a fourth communication link, wherein: the second controller, based at least in part on a signal received from the first controller, operates the first brake unit and the fourth brake unit, and the third controller, based at least in part on the signal received from the first controller, operates the second brake unit and the third brake unit.

B. The vehicle of paragraph A, wherein the first controller comprises one or more processors and one or more non-transitory computer readable media storing instructions that, when executed by the one or more processors, cause the one or more processors to perform operations comprising: receiving, via one or more of the first communication link or the second communication link, a status message indicative of at least one of a state of the second controller or a state of at least one of the first brake unit or the fourth brake unit; and determining, based at least in part on an amount of time since the status message was received, that the second controller has failed.

C. The vehicle of paragraph A or B, wherein the second controller comprises one or more processors and one or more non-transitory computer readable media storing instructions that, when executed by the one or more processors, cause the one or more processors to perform operations comprising: transmitting, via one or more of the first communication link or the second communication link and based at least in part on an operational status of the second controller, a message indicative of the operational status of the second controller to the first controller; and transmitting, via the fourth communication link and based at least in part on the operational status of the second controller, the message to the third controller, wherein the third controller, based at least in part on receiving the message and an operational status of the third controller, transmits the message to the first controller via the third communication link.

D. The vehicle of any of paragraphs A-C, wherein, based at least in part on a difference in messages received at the first controller via the at least one of the first communication link, the second communication link, or the third communication link, the first controller determines a failure of one or more of the second controller, the third controller, the first communication link, the second communication link, the third communication link, or the fourth communication link.

E. The vehicle of any of paragraphs A-D, wherein the first controller comprises one or more processors and one or more non-transitory computer readable media storing instructions that, when executed by the one or more processors, cause the one or more processors to perform operations comprising: receiving, from a computing system of the vehicle, a message comprising a request to engage a braking operation; transmitting, via the first communication link and the second communication link, the message to the second controller; and transmitting, via the third communication link, the message to the third controller, wherein the third controller, based at least in part on receiving the message, transmits the message to the second controller and operates the second brake unit and the third brake unit, and wherein the second controller, based at least in part on receiving the message, operates the first brake unit and the fourth brake unit.

F. The vehicle of any of paragraphs A-E, wherein at least one of: based at least in part on a failure of the second controller, the second brake unit and the third brake unit are engaged; based at least in part on a failure of the third controller, the first brake unit and the fourth brake unit are engaged; or based at least in part on failure of the first controller, the first brake unit, the second brake unit, the third brake unit, and the fourth brake unit are engaged.

G. A method comprising: transmitting, by a first controller, a command to at least one of a second controller or a third controller to operate a brake system of a vehicle; operating, using the second controller, a first brake unit and a fourth brake unit of the brake system based at least in part on a status of the first controller; and operating, using the third controller, a second brake unit and a third brake unit of the brake system based at least in part on the status of the first controller and a status of the second controller.

H. The method of paragraph G, wherein: the second controller is communicatively coupled to the first controller via a first communication link and a second communication link; and the method further comprises: receiving at the second controller, via one or more of the first communication link or the second communication link, a status message indicative of a state of the first controller; and determining, based at least in part on an amount of time since the status message was received, that the first controller has failed.

I. The method of paragraph G or H, wherein: the third controller is communicatively coupled to the first controller via a third communication link and communicatively coupled to the second controller via a fourth communication link; and the method further comprises: receiving at the third controller, via the fourth communication link, a message indicative of the status of the second controller; and transmitting, by the third controller and based at least in part on the message and an operational status of the third controller, the message to the first controller via the third communication link.

J. The method of any of paragraphs G-I, further comprising: operating the brake system of the vehicle based at least in part on at least one of: the status of the first controller; the status of the second controller; the status of the third controller; a status of at least one of the first brake unit, the second brake unit, the third brake unit, or the fourth brake unit; a status of the first communication link; a status of the second communication link; a status of the third communication link; or a status of the fourth communication link.

K. The method of any of paragraphs G-J, wherein: the first controller and the third controller are powered by a first power source; the second controller is powered by a second power source; and operating the brake system of the vehicle is based at least in part on at least one of a status of the first power source and the second power source.

L. The method of any of paragraphs G-K, further comprising: determining a status of the first power source; and based at least in part on a failure associated with the first power source, operating, using the second controller, the first brake unit and the fourth brake unit.

M. The method of any of paragraphs G-L, further comprising: determining a status of the first power source; and based at least in part on a failure associated with the second power source, operating, using the third controller, the second brake unit and the third brake unit.

N. The method of any of paragraphs G-M, wherein operating the brake system of the vehicle further comprises: receiving at the first controller, from a computing system of the vehicle, a message comprising a request to engage a braking operation; transmitting, via the first communication link and the second communication link, the message to the second controller; and transmitting, via the third communication link, the message to the third controller, wherein the second controller, based at least in part on receiving the message, operates the first brake unit and the fourth brake unit; and the third controller, based at least in part on receiving the message, transmits the message to the second controller and operates the second brake unit and the third brake unit.

O. The method of any of paragraphs G-N, wherein: operating the brake system of the vehicle further comprises one of: transmitting the command to at least one of the second controller or the third controller to open the first brake unit, the second brake unit, the third brake unit, and the fourth brake unit, allowing the vehicle to move; or transmitting the command to at least one of the second controller or the third controller to close at least one of the first brake unit, the second brake unit, the third brake unit, or the fourth brake unit, causing the vehicle to stop.

P. The method of any of paragraphs G-O, wherein operating the brake system of the vehicle further comprises performing at least one of: based at least in part on a status associated with the first controller, operating the second controller to close the first brake unit and the fourth brake unit, causing the vehicle to stop; and operating the third controller to close the second brake unit and the third brake unit, causing the vehicle to stop; or based at least in part on a status associated with the second controller, operating the third controller to close the second brake unit and the third brake unit, causing the vehicle to stop.

Q. One or more non-transitory computer-readable media storing instructions that, when executed, cause one or more processors to perform operations comprising: transmitting, by a first controller, a command to at least one of a second controller or a third controller to operate a brake system of a vehicle; operating, using the second controller, a first brake unit and a fourth brake unit of the brake system based at least in part on a status of the first controller; and operating, using the third controller, a second brake unit and a third brake unit of the brake system based at least in part on the status of the first controller and a status of the second controller.

R. The one or more non-transitory computer-readable media of paragraph Q, the operations further comprising at least one of: based at least in part on a failure associated with the first controller, operating, using the second controller, the first brake unit and the fourth brake unit; and operating, using the third controller, the second brake unit and the third brake unit; or based at least in part on a failure associated with the second controller, operating, using the third controller, the second brake unit and the third brake unit.

S. The one or more non-transitory computer-readable media of paragraph Q or R, wherein: operating the brake system of the vehicle further comprises one of: transmitting the command to at least one of the second controller or the third controller to open the first brake unit, the second brake unit, the third brake unit, and the fourth brake unit, allowing the vehicle to move; or transmitting the command to at least one of the second controller or the third controller to close at least one of the first brake unit, the second brake unit, the third brake unit, or the fourth brake unit, causing the vehicle to stop.

T. The one or more non-transitory computer-readable media of any of paragraphs Q-S, wherein: the second controller is communicatively coupled to the first controller via a first communication link and a second communication link; the third controller is communicatively coupled to the first controller via a third communication link and communicatively coupled to the second controller via a fourth communication link; and operating the brake system of the vehicle further comprises one of: receiving at the second controller, via one or more of the first communication link or the second communication link, a status message indicative of a state of the first controller; and determining, based at least in part on an amount of time since the status message was received, that the first controller has failed; or receiving at the third controller, via the fourth communication link, a message indicative of the status of the second controller, and transmitting, based at least in part on the message and an operational status of the third controller, the message to the first controller via the third communication link.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:
a first brake unit;
a second brake unit;
a third brake unit;
a fourth brake unit;
a first controller powered by a first power source;
a second controller powered by a second power source and communicatively coupled to the first controller via a first and second communication link; and
a third controller powered by the first power source and communicatively coupled to the first controller via a third communication link and to the second controller via a fourth communication link,
wherein:
the second controller, based at least in part on a signal received from the first controller, operates the first brake unit and the fourth brake unit, and
the third controller, based at least in part on the signal received from the first controller, operates the second brake unit and the third brake unit.

2. The vehicle of claim 1, wherein the first controller comprises one or more processors and one or more non-transitory computer readable media storing instructions that, when executed by the one or more processors, cause the one or more processors to perform operations comprising:
receiving, via one or more of the first communication link or the second communication link, a status message indicative of at least one of a state of the second controller or a state of at least one of the first brake unit or the fourth brake unit; and
determining, based at least in part on an amount of time since the status message was received, that the second controller has failed.

3. The vehicle of claim 1, wherein the second controller comprises one or more processors and one or more non-transitory computer readable media storing instructions that, when executed by the one or more processors, cause the one or more processors to perform operations comprising:
transmitting, via one or more of the first communication link or the second communication link and based at least in part on an operational status of the second controller, a message indicative of the operational status of the second controller to the first controller; and
transmitting, via the fourth communication link and based at least in part on the operational status of the second controller, the message to the third controller,
wherein the third controller, based at least in part on receiving the message and an operational status of the third controller, transmits the message to the first controller via the third communication link.

4. The vehicle of claim 3, wherein, based at least in part on a difference in messages received at the first controller via the at least one of the first communication link, the second communication link, or the third communication link, the first controller determines a failure of one or more of the second controller, the third controller, the first communication link, the second communication link, the third communication link, or the fourth communication link.

5. The vehicle of claim 1, wherein the first controller comprises one or more processors and one or more non-transitory computer readable media storing instructions that, when executed by the one or more processors, cause the one or more processors to perform operations comprising:
receiving, from a computing system of the vehicle, a message comprising a request to engage a braking operation;
transmitting, via the first communication link and the second communication link, the message to the second controller; and
transmitting, via the third communication link, the message to the third controller,
wherein the third controller, based at least in part on receiving the message, transmits the message to the second controller and operates the second brake unit and the third brake unit, and
wherein the second controller, based at least in part on receiving the message, operates the first brake unit and the fourth brake unit.

6. The vehicle of claim 1, wherein at least one of:
based at least in part on a failure of the second controller, the second brake unit and the third brake unit are engaged;
based at least in part on a failure of the third controller, the first brake unit and the fourth brake unit are engaged; or
based at least in part on failure of the first controller, the first brake unit, the second brake unit, the third brake unit, and the fourth brake unit are engaged.

7. A method implemented by a vehicle having a brake system, the method comprising:
transmitting, by a first controller of the vehicle, a command to at least one of a second controller or a third controller of the vehicle to operate the brake system;
operating, using the second controller, a first brake unit and a fourth brake unit of the brake system based at least in part on a status of the first controller; and
operating, using the third controller, a second brake unit and a third brake unit of the brake system based at least in part on the status of the first controller and a status of the second controller.

8. The method of claim 7, wherein:
the second controller is communicatively coupled to the first controller via a first communication link and a second communication link; and
the method further comprises:
   receiving at the second controller, via one or more of the first communication link or the second communication link, a status message indicative of a state of the first controller; and
   determining, based at least in part on an amount of time since the status message was received, that the first controller has failed.

9. The method of claim 8, wherein:
the third controller is communicatively coupled to the first controller via a third communication link and communicatively coupled to the second controller via a fourth communication link; and
the method further comprises:
   receiving at the third controller, via the fourth communication link, a message indicative of the status of the second controller; and
   transmitting, by the third controller and based at least in part on the message and an operational status of the third controller, the message to the first controller via the third communication link.

10. The method of claim 9, further comprising:
operating the brake system of the vehicle based at least in part on at least one of:
the status of the first controller;
the status of the second controller;
the status of the third controller;
a status of at least one of the first brake unit, the second brake unit, the third brake unit, or the fourth brake unit;
a status of the first communication link;
a status of the second communication link;
a status of the third communication link; or
a status of the fourth communication link.

11. The method of claim 9, wherein operating the brake system of the vehicle further comprises:
receiving at the first controller, from a computing system of the vehicle, a message comprising a request to engage a braking operation;
transmitting, via the first communication link and the second communication link, the message to the second controller; and
transmitting, via the third communication link, the message to the third controller,
wherein the second controller, based at least in part on receiving the message, operates the first brake unit and the fourth brake unit; and
   the third controller, based at least in part on receiving the message, transmits the message to the second controller and operates the second brake unit and the third brake unit.

12. The method of claim 7, wherein:
the first controller and the third controller are powered by a first power source;
the second controller is powered by a second power source; and
operating the brake system of the vehicle is based at least in part on at least one of a status of the first power source and the second power source.

13. The method of claim 12, further comprising:
determining a status of the first power source; and
based at least in part on a failure associated with the first power source, operating, using the second controller, the first brake unit and the fourth brake unit.

14. The method of claim 12, further comprising:
determining a status of the first power source; and
based at least in part on a failure associated with the second power source, operating, using the third controller, the second brake unit and the third brake unit.

15. The method of claim 7, wherein:
operating the brake system of the vehicle further comprises one of:
   transmitting the command to at least one of the second controller or the third controller to disengage the first brake unit, the second brake unit, the third brake unit, and the fourth brake unit, allowing the vehicle to move; or
   transmitting the command to at least one of the second controller or the third controller to engage at least one of the first brake unit, the second brake unit, the third brake unit, or the fourth brake unit, causing the vehicle to stop.

16. The method of claim 7, wherein operating the brake system of the vehicle further comprises performing at least one of:
based at least in part on a status associated with the first controller, operating the second controller to engage the first brake unit and the fourth brake unit, causing the vehicle to stop; and
operating the third controller to engage the second brake unit and the third brake unit, causing the vehicle to stop; or
based at least in part on a status associated with the second controller, operating the third controller to engage the second brake unit and the third brake unit, causing the vehicle to stop.

17. One or more non-transitory computer-readable media storing instructions that, when executed, cause one or more processors to perform operations comprising:
transmitting, by a first controller of a vehicle, a command to at least one of a second controller or a third controller of the vehicle to operate a brake system of the vehicle;
operating, using the second controller, a first brake unit and a fourth brake unit of the brake system based at least in part on a status of the first controller; and
operating, using the third controller, a second brake unit and a third brake unit of the brake system based at least in part on the status of the first controller and a status of the second controller.

18. The one or more non-transitory computer-readable media of claim 17, the operations further comprising at least one of:
based at least in part on a failure associated with the first controller, operating, using the second controller, the first brake unit and the fourth brake unit; and operating, using the third controller, the second brake unit and the third brake unit; or
based at least in part on a failure associated with the second controller, operating, using the third controller, the second brake unit and the third brake unit.

19. The one or more non-transitory computer-readable media of claim 17, wherein:
operating the brake system of the vehicle further comprises one of:
   transmitting the command to at least one of the second controller or the third controller to disengage the first brake unit, the second brake unit, the third brake unit, and the fourth brake unit, allowing the vehicle to move; or
   transmitting the command to at least one of the second controller or the third controller to engage at least one of the first brake unit, the second brake unit, the third brake unit, or the fourth brake unit, causing the vehicle to stop.

20. The one or more non-transitory computer-readable media of claim 17, wherein:
- the second controller is communicatively coupled to the first controller via a first communication link and a second communication link;
- the third controller is communicatively coupled to the first controller via a third communication link and communicatively coupled to the second controller via a fourth communication link; and
- operating the brake system of the vehicle further comprises one of:
  - receiving at the second controller, via one or more of the first communication link or the second communication link, a status message indicative of a state of the first controller; and determining, based at least in part on an amount of time since the status message was received, that the first controller has failed; or
  - receiving at the third controller, via the fourth communication link, a message indicative of the status of the second controller, and transmitting, based at least in part on the message and an operational status of the third controller, the message to the first controller via the third communication link.

\* \* \* \* \*